(12) United States Patent
Abe

(10) Patent No.: US 9,430,168 B2
(45) Date of Patent: Aug. 30, 2016

(54) RECORDING MEDIUM STORING A PROGRAM FOR DATA RELOCATION, DATA STORAGE SYSTEM AND DATA RELOCATING METHOD

(71) Applicant: FUJITSU LIMITED, Kawasaki-shi, Kanagawa (JP)

(72) Inventor: Tomoaki Abe, Nagoya (JP)

(73) Assignee: FUJITSU LIMITED, Kawasaki (JP)

( * ) Notice: Subject to any disclaimer, the term of this patent is extended or adjusted under 35 U.S.C. 154(b) by 130 days.

(21) Appl. No.: 14/144,773

(22) Filed: Dec. 31, 2013

(65) Prior Publication Data

US 2014/0297944 A1  Oct. 2, 2014

(30) Foreign Application Priority Data

Mar. 26, 2013  (JP) .................................. 2013-063854

(51) Int. Cl.
*G06F 12/02* (2006.01)
*G06F 3/06* (2006.01)
*G06F 9/00* (2006.01)

(52) U.S. Cl.
CPC ............. *G06F 3/0689* (2013.01); *G06F 3/064* (2013.01); *G06F 3/0611* (2013.01); *G06F 3/0619* (2013.01); *G06F 3/0647* (2013.01); *G06F 3/0685* (2013.01); *G06F 9/00* (2013.01)

(58) Field of Classification Search
CPC .... G06F 3/0659; G06F 13/28; G06F 3/0611; G06F 3/0676; G06F 3/0682; G06F 13/1626; G06F 3/0632; G06F 3/064; G06F 3/061; G06F 17/30312; G06F 2003/0697; G06F 3/0614; G06F 3/067; G06F 3/0679; G06F 17/30067; G06F 17/30091; G06F 2212/213; G06F 2212/224; G06F 3/0647; G06F 3/0689

USPC ......... 711/158, 111, 154, 112, 167, E12.001, 711/156, 170, 4, 100, 104, 117, E12.002, 711/E12.103, 1, 103, 114, 165, 218
See application file for complete search history.

(56) References Cited

U.S. PATENT DOCUMENTS

| 8,280,854 | B1 * | 10/2012 | Emmert ............ G06F 17/30221 707/637 |
| 2002/0004857 | A1 * | 1/2002 | Arakawa ............... G06F 3/0605 710/1 |
| 2004/0205311 | A1 * | 10/2004 | Hulsey .......................... 711/162 |
| 2005/0204095 | A1 * | 9/2005 | Dayan et al. ................. 711/112 |
| 2005/0278398 | A1 | 12/2005 | Tokuda et al. |
| 2006/0126615 | A1 * | 6/2006 | Angtin et al. ................ 370/389 |
| 2008/0005521 | A1 * | 1/2008 | Cholleti ................ G06F 12/126 711/170 |
| 2008/0126673 | A1 | 5/2008 | Kaneda |

(Continued)

FOREIGN PATENT DOCUMENTS

| JP | 2003-076586 | 3/2003 |
| JP | 2003-271425 | 9/2003 |

(Continued)

*Primary Examiner* — Sanjiv Shah
*Assistant Examiner* — Edward Waddy, Jr.
(74) *Attorney, Agent, or Firm* — Staas & Halsey LLP

(57) ABSTRACT

A non-transitory computer-readable recording medium has stored therein a program for causing a computer to execute a process. The process includes identifying a data block from among a plurality of data blocks in a first storage for relocation to a second storage, determining an access mode of the identified data block, the access mode including sequential access or random access, and relocating the identified data block to the second storage based on the determined access mode.

17 Claims, 9 Drawing Sheets

(56) References Cited

U.S. PATENT DOCUMENTS

| | | | | |
|---|---|---|---|---|
| 2009/0222494 | A1* | 9/2009 | Pizlo | G06F 12/0269 |
| 2010/0205390 | A1* | 8/2010 | Arakawa | G06F 3/0607 |
| | | | | 711/162 |
| 2010/0281230 | A1* | 11/2010 | Rabii | G06F 3/0605 |
| | | | | 711/165 |
| 2012/0185749 | A1* | 7/2012 | Okada | G06F 3/061 |
| | | | | 714/758 |

FOREIGN PATENT DOCUMENTS

| JP | 2006-004011 | 1/2006 |
|---|---|---|
| JP | 2008-033911 | 2/2008 |

* cited by examiner

FIG. 4

| APPLICATION | FILE | ACCESS MODE | PHYSICAL STORAGE (STORAGE LOCATION) | ACCESS FREQUENCY |
|---|---|---|---|---|
| Oracle | DB | RANDOM | storage1-lun0-block10 | 200 IOPS |
| | LOG | SEQUENTIAL | storage1-lun0-block20 | 100 IOPS |
| ... | ... | ... | ... | ... |

221

RECORDING MEDIUM STORING A PROGRAM FOR DATA RELOCATION, DATA STORAGE SYSTEM AND DATA RELOCATING METHOD

CROSS-REFERENCE TO RELATED APPLICATION

This application is based upon and claims the benefit of priority of the prior Japanese Patent Application No. 2013-063854, filed on Mar. 26, 2013, the entire contents of which are incorporated herein by reference.

FIELD

The embodiment discussed herein is related to a recording medium, a system and a method.

BACKGROUND

Three types of disk drives, namely a solid state drive (SSD), a serial attached small computer system interface (SCSI) (SAS) disk, and a serial advanced technology attachment (SATA) disk, can be listed as examples of disk drives to be used in storage systems such as a disk array system. As illustrated in FIG. 1, in terms of reliability and performance, among the three types of disk drives, an SSD comes first, an SAS disk comes second, and an SATA disk comes third.

If a server employs a storage device that includes a hierarchized disk (see FIG. 1) having the three types of disks that differ in characteristics as mentioned above, storage hierarchization control as described below is carried out. Specifically, with a configuration that employs a hierarchized disk, a data block to be relocated and a disk to which that data block is to be relocated are determined on the basis of the frequency of access at a disk side, and the data block is relocated accordingly, as illustrated in FIG. 1.

For example, if the frequency of access to a given data block, included in a file on the SSD is low, that data block is moved from the SSD to the SAS disk and is relocated on the SAS disk. Similarly, if the frequency of access to a given data block on the SAS disk is low, that data block is moved from the SAS disk to the SATA disk and is relocated on the SATA disk. Meanwhile, if the frequency of access to a given data block on the SATA disk increases, that data block is moved from the SATA disk to the SAS disk and is relocated on the SAS disk. Similarly, if the frequency of access to a given data block on the SAS disk increases, that data block is moved from the SAS disk to the SSD and is relocated on the SSD.

Japanese Laid-open Patent Publication No. 2006-4011 is an example of related art.

SUMMARY

According to an aspect of the embodiment, a non-transitory computer-readable recording medium has stored therein a program for causing a computer to execute a process. The process includes identifying a data block from among a plurality of data blocks in a first storage for relocation to a second storage, determining an access mode of the identified data block, the access mode including sequential access or random access, and relocating the identified data block to the second storage based on the determined access mode.

The object and advantages of the embodiment will be realized and attained by the elements and combinations particularly pointed out in the claims.

It is to be understood that both the foregoing general description and the following detailed description are exemplary and explanatory and are not restrictive of the claims.

BRIEF DESCRIPTION OF DRAWINGS

FIG. 4 illustrates an exemplary file access mode table of the embodiment;

DESCRIPTION OF EMBODIMENT

The inventor has found from a study that when some of the data blocks in a sequential access file on an SSD are relocated to an SAS disk, the arrangement of the data blocks forming the file becomes nonsequential. Thus, the sequential access performance of the data blocks on the SAS disk degrades as compared with the access performance of the data blocks on the SSD. As the frequency of relocation in the file increases, the data in the file is further fragmented, and the sequential access performance of the data blocks on the SAS disk further degrades accordingly.

In order to determine an access mode of a data block included in a file, that is, whether or not the data block is a sequential access data block, and to relocate the data block accordingly so as to suppress fragmentation of the data, information on an access (read/write) layer pertaining to the specifications of an application that accesses a hierarchized disk is desired. In other words, a server that employs a hierarchized disk does not have information as to with what access mode the hierarchized disk actually arranges the data. Thus, an existing hierarchized disk experiences such a disadvantage that the sequential access performance degrades and the data is fragmented through relocation.

According to an embodiment described hereinafter, data fragmentation caused by relocating a data block in a hierarchized disk can be suppressed.

Hereinafter, an embodiment will be described with reference to the drawings.

[1] Configuration of Storage System of Embodiment

Figure 2:
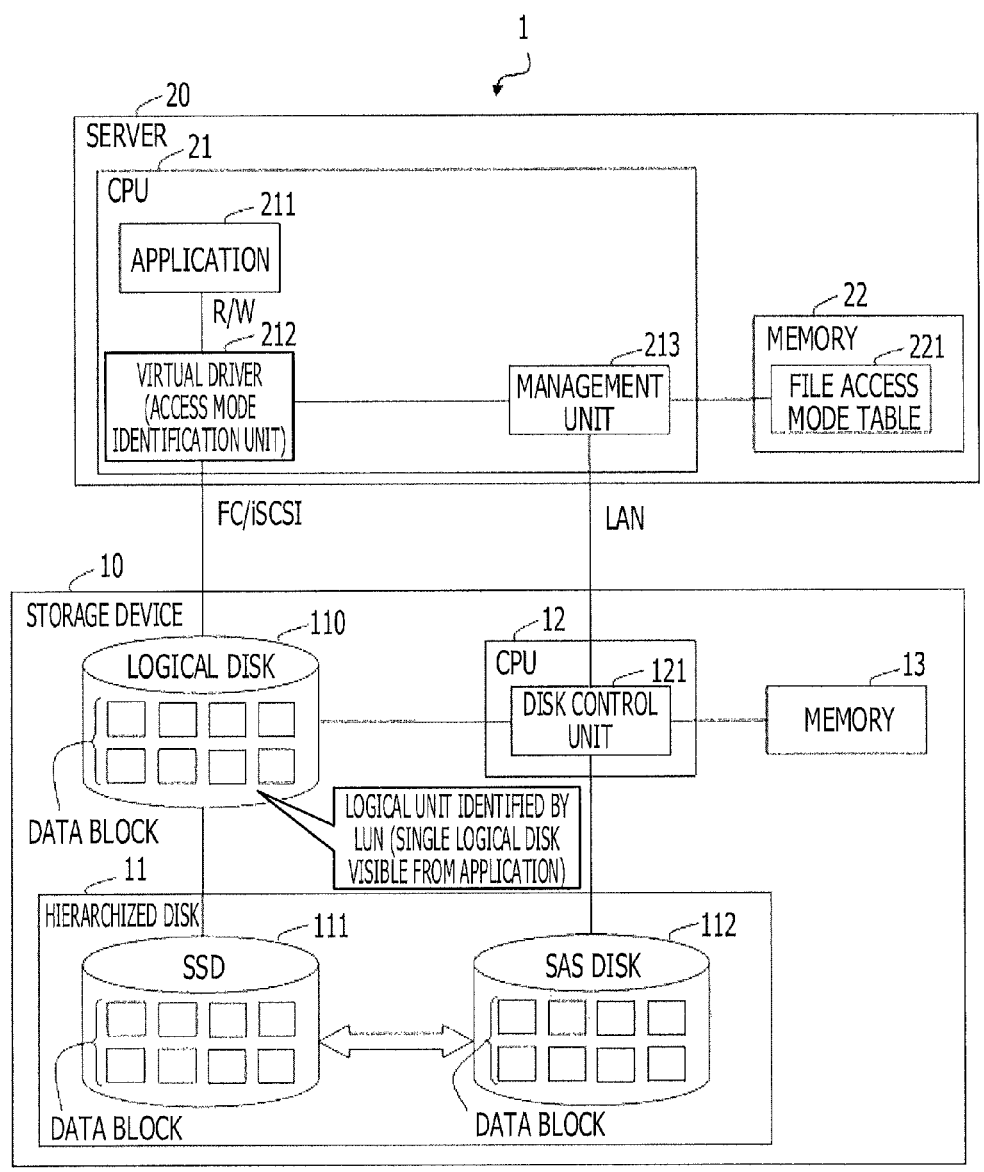
FIG. 2 is a block diagram illustrating a hardware configuration and a functional configuration of a storage system according to an embodiment.

FIG. 2 is a block diagram illustrating a hardware configuration and a functional configuration of a storage system 1 according to an embodiment. As illustrated in FIG. 2, the storage system 1 includes a storage device 10 and a server (information processing device) 20.

The storage device 10, which is accessed by the server 20 (application 211) and is also managed by the server 20 (management unit 213), includes a hierarchized disk 11, a central processing unit (CPU) 12, and a memory 13. In FIG.

2, a logical disk 110 is illustrated in the storage device 10. The logical disk 110 is identified by a logical unit number (LUN) and is a logical disk that is visible from the application 211, which will be described later.

Figure 1:
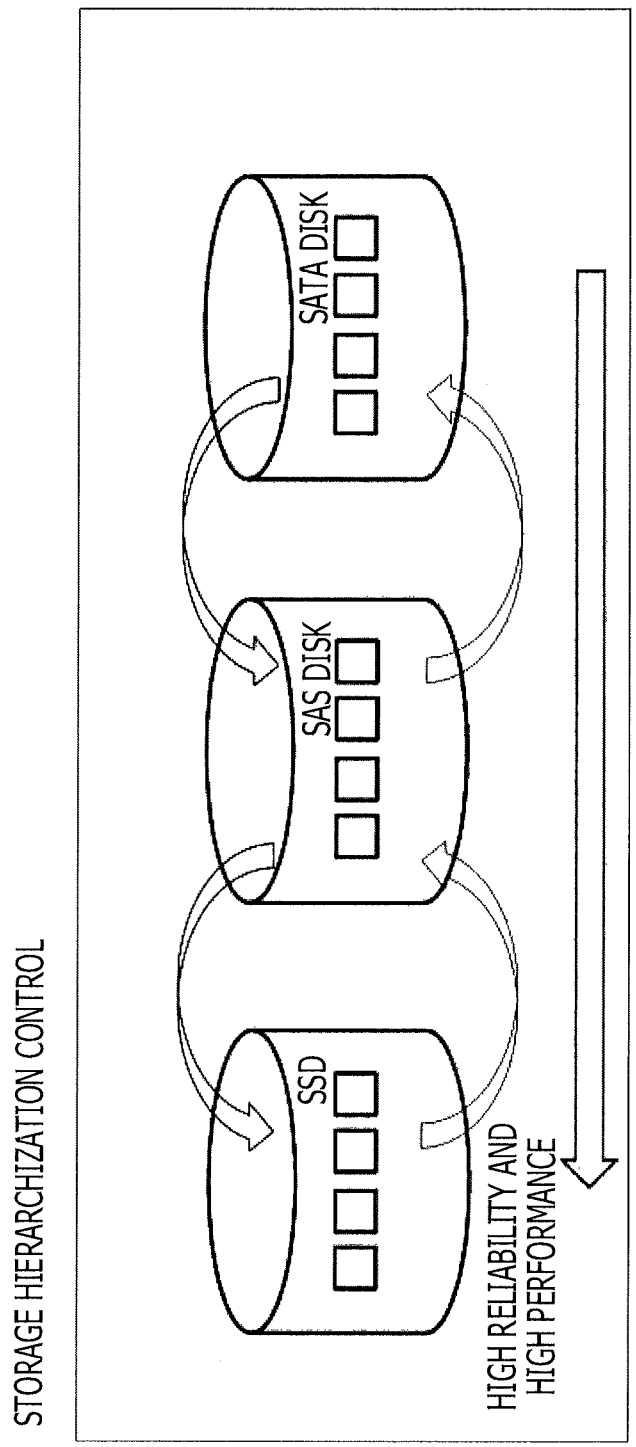
FIG. 1 is a diagram for describing a hierarchized disk and storage hierarchization control.

The hierarchized disk 11 includes multiple disks, each having distinct characteristics. As illustrated in FIG. 2, the hierarchized disk 11 of the embodiment includes two types of disks, namely an SSD 111 and an SAS disk 112. Note, however, that the embodiment is not limited thereto, and the embodiment is applied similarly to a case where the hierarchized disk 11 includes, for example, three types of disks, namely an SSD, an SAS disk, and an SATA disk, as in the case described above with reference to FIG. 1.

Unlike a hard disk, an SSD does not include a disk, and thus no time is spent moving a reading device (head) over the disk (i.e., seek time) or waiting for the target data to rotate to a head position (i.e., search time). Thus, with an SSD, whether data blocks included in a sequential access file are arranged sequentially or fragmented and arranged randomly does not make a difference in terms of access performance.

On the other hand, with an SAS disk or an SATA disk, if data blocks included in a sequential access file are fragmented and arranged randomly, the seek time or the search time is extended as compared with the case where the data blocks are arranged sequentially, and thus the access performance degrades.

Therefore, in the embodiment, at least when a sequential access data block is relocated on an SAS disk or an SATA disk, whether or not the access mode of the data block to be relocated indicates sequential access is taken into consideration.

Thus, in the embodiment, when a data block is relocated from the SSD 111 to the SAS disk 112, the access mode of the data block to be relocated is determined, and the data block is relocated accordingly on the basis of the determined access mode. If the hierarchized disk 11 includes the three types of disks described above, the data block is relocated on the basis of the access mode thereof, as in the embodiment, when a data block is relocated from the SSD to the SAS disk, from the SAS disk to the SATA disk, or from the SATA disk to the SAS disk. When a data block is relocated from the SAS disk to the SSD, the target data block may or may not be relocated on the basis of the access mode thereof.

The CPU (processing unit, computer) 12 loads a program stored in the memory 13 and executes the program to thus function as a disk control unit 121, which will be described later. The disk control unit 121 controls the hierarchized disk 11 and also functions in the storage hierarchization control, which has been described with reference to FIG. 1.

The memory 13 is a random access memory (RAM) or the like and stores the program to be executed by the CPU 12 as well as various pieces of data and so on to be used by the CPU 12 when carrying out processing (control processing and so on by the disk control unit 121) in the storage device 10.

The server 20 is coupled to the storage device 10 through Fibre Channel (FC)/iSCSI and accesses the hierarchized disk 11 of the storage device 10. The server 20 is coupled to the disk control unit 121 (CPU 12) of the storage device 10 through a local area network (LAN) and manages the storage device 10. The server 20 includes a CPU 21 and a memory 22.

The CPU 21 loads the application (application program) 211 stored in the memory 22 and executes the application 211 to thus issue a read/write (R/W) command (input/output request) to the hierarchized disk 11 of the storage number 10. As described above, the application 211 recognizes the hierarchized disk 11 as the logical disk 110 and issues the R/W command to the logical disk 110.

In addition, the CPU 21 loads a program stored in the memory 22 and executes the program to thus realize a virtual driver (virtual device) 212 between the application 211 and the storage number 10. The virtual driver 212 functions as an access mode identification unit, which will be described later.

Furthermore, the CPU 21 loads a program stored in the memory 22 and executes the program to thus create a file access mode table 221, which will be described later, and to function as the management unit 213, which will be described later, using the created table 221.

The memory 22 is a RAM or the like and stores the programs to be executed by the CPU 21 and the table 221 as well as various pieces of data and so on to be used by the CPU 21 when carrying out processing (processing and so on by the application 211, the virtual driver 212, and the management unit 213) in the server 20.

In the storage system 1 illustrated in FIG. 2, the single server 20 includes the application 211, the virtual driver 212, the management unit 213, and the file access mode table 221. Alternatively, the application 211, the virtual driver 212, the management unit 213, and the file access mode table 221 may be distributed between two servers. For example, a business server that accesses the storage device 10 may include the application 211 and the virtual driver 212, and a management server may be coupled to the business server and the storage device 10 through a LAN and may include the management unit 213 and the file access mode table 221.

Figure 3:
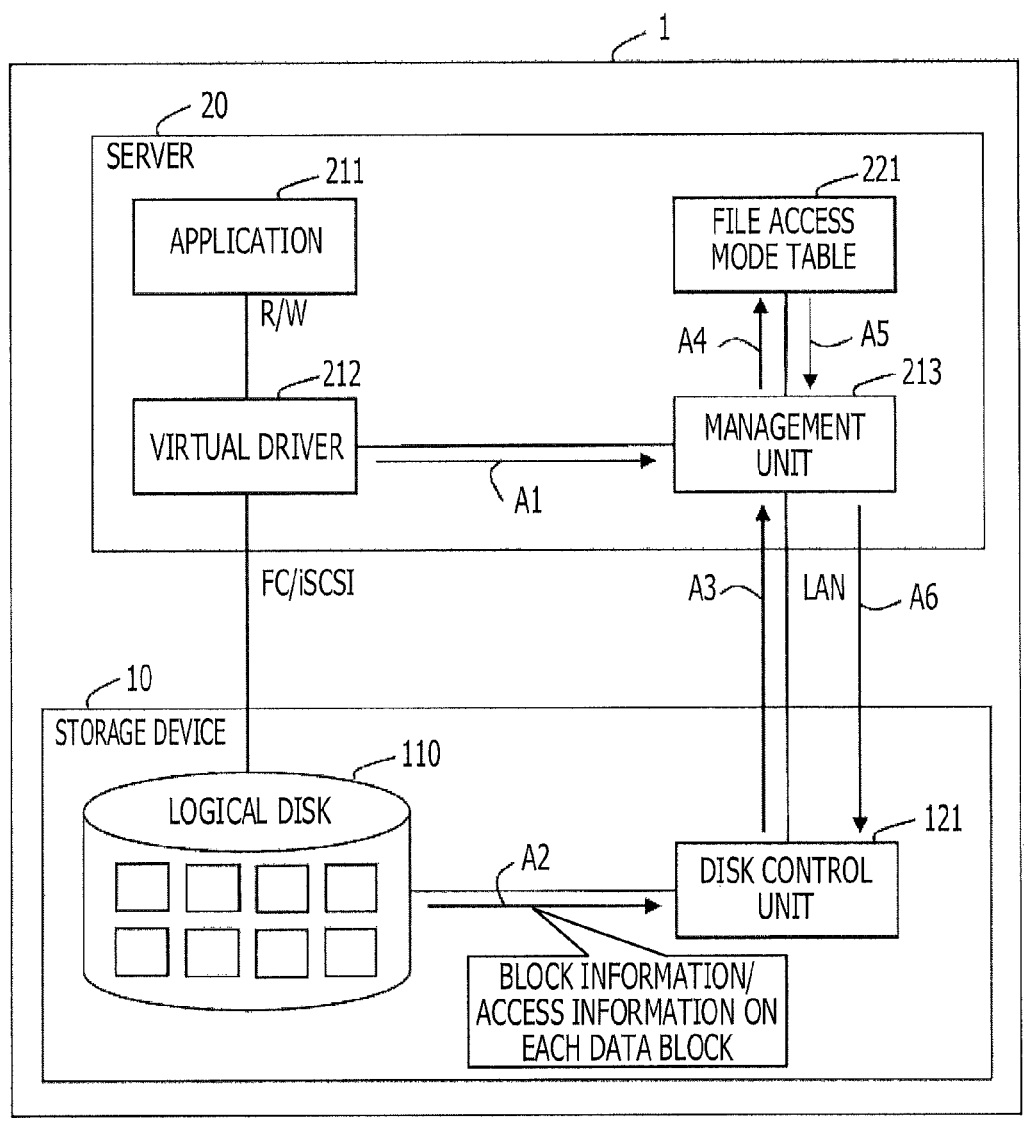
FIG. 3 is a diagram for describing a function and an operation of the storage system illustrated in FIG. 2.

Hereinafter, specific functions of the disk control unit 121, the virtual driver 212, and the management unit 213 of the storage system 1 of the embodiment will be described with reference to FIG. 3. In addition, a specific example of the file access mode table 221 stored in the memory 22 of the server 20 will be described with reference to FIG. 4. FIG. 3 schematically illustrates the function and the operation of the storage system 1, and FIG. 4 illustrates an example of the file access mode table 221.

Upon receiving an R/W command (input/output request) to the storage device 10 from the application 211, the virtual driver (virtual device) 212 functions as the access mode identification unit that identifies access mode information on a file-by-file basis. The access mode information includes information for identifying the application 211 that uses the storage device 10 (i.e., application name or the like), information for identifying the target file of the R/W command (i.e., file name or the like), and an access mode of the target file. The virtual driver 212 provides the management unit 213 with the obtained and identified access mode information (see arrow A1 in FIG. 3).

The virtual driver 212 identifies the access mode of the target file, that is, whether the target file is a sequential access file or a random access file, through the following process. The virtual device 212 determines whether or not the R/W command seeks an R/W position (input/output position) in the target file through an index. If the R/W command does not seek the R/W position through an index, that is, when the R/W command reads the target file from the beginning thereof, the virtual device 212 determines that the target file is a sequential access file. Meanwhile, if the R/W command seeks the R/W position through an index, the virtual device 212 determines that the target file is a random access file.

The virtual driver 212 identifies the access mode of each target file that is not registered in the file access mode table 221, among the files to be used by the application 211. In addition, the virtual driver 212 continues with the identification of the access mode for a specific period of time after the application 211 starts accessing the storage device 10.

The disk control unit 121 obtains block information, which contains storage locations (physical locations) of data blocks included in each file stored in the hierarchized disk 11, and access information of each data block (see arrow A2 in FIG. 3) and provides the management unit 213 of the server 20 with the obtained block information and access information (see arrow A3 in FIG. 3). The block information includes information for identifying the application 211 (i.e., application name or the like), information for identifying a target file to be used by the application 211 (i.e., file name or the like), and information on the physical locations of the data blocks included in the target file (i.e., a physical storage where the logical disk 110, which is recognized by the application 211 of the server 20, is located). Meanwhile, the access information includes the frequency of access to each data block by the application 211.

The management unit 213 registers the access mode information provided by the virtual device 212 and the block information and the access information provided by the disk control unit 121 into the file access mode table 221 in the memory 22 (see arrow A4 in FIG. 3).

As illustrated in FIG. 4, the application name of the application 211, the file name of the target file to be used by the application 211, and the access mode (sequential access or random access) of the target file identified by the virtual driver 212 are registered into the file access mode table 221 on the basis of the access mode information provided by the virtual device 212. In addition, as illustrated in FIG. 4, the block information and the access information provided by the disk control unit 121 are associated with the access mode information through the application name and the file name, which are then registered into the file access mode table 221. In other words, the storage location of each data block included in the target file and the frequency of access to each data block are registered. In FIG. 4, the storage location of and the frequency of access to a single data block are illustrated. In reality, however, the storage location of and the frequency of access to each data block are registered. In FIG. 4, the unit for the frequency of access is input/output per second (IOPS) indicating the reading/writing frequency per second.

The management unit 213 refers to the file access mode table 221 (see arrow A5 in FIG. 3) and determines a data block to be relocated. Specifically, the management unit 213 determines a data block that is located in the SSD 111 and has a low frequency of access to be the data block to be relocated to the SAS disk 112. Meanwhile, the management unit 213 determines a data block that is located in the SAS disk 112 and has a high frequency of access to be the data block to be relocated to the SSD 111. In addition, the management unit 213 refers to the file access mode table 221 (see arrow A5 in FIG. 3) and determines the access mode (sequential access or random access) of the data block to be relocated. In other words, the management unit 213 determines the access mode of the data block on the basis of the access mode information on each file that is used by the application 211 and the block information on each file provided by the disk control unit 121.

In addition, the management unit 213 determines the content of relocation in the hierarchized disk 11 on the basis of the block information (storage location) of the data block to be relocated, which has been determined to be relocated on the basis of the frequency of access thereto, and the access mode, which has been determined by the management unit 213, of the data block to be relocated, as will be described later. The management unit 213 instructs the disk control unit 121 of the storage device 10 to relocate the data block in accordance with the determined relocation content (see arrow A6 in FIG. 3).

The disk control unit 121 of the storage device 10 relocates the data block in the hierarchized disk 11 as specified by the management unit 213.

In the storage system 1 of the embodiment, when a data block is relocated from the SSD 111 to the SAS disk 112, the content of that relocation is determined by the management unit 213 in a manner that will be described below with reference to items (A1) to (A4), and the disk control unit 121 relocates the target data block. A specific method for determining the content of relocation by the management unit 213 will be described later. In addition, a specific example of relocation by the disk control unit 121 will be described later with reference to FIGS. 8 and 9.

[2] Operation of Storage System of Embodiment

In the storage device 10, access information (access frequency) of a data area is determined on a data block by data block basis through the function of the storage hierarchization control of the disk control unit 121. To date, with the data obtained on a data block by data block basis through the function of the storage hierarchization control of the disk control unit 121, it has been unclear as to which access mode (sequential access or random access) the data within each data block has. In the embodiment, however, the block information obtained by the disk control unit 121 is associated with the access mode information obtained by the virtual driver 212 on the server 20, making it possible to determine the access mode of data blocks included, in each file.

A data block that has been determined to be a sequential access data block is relocated such that the order of the data blocks included in the file is retained. If data blocks that form a sequential access file are distributed between the SSD 111 and the SAS disk 112, free spaces are provided respectively in front of and after such data blocks to facilitate the sequential relocation. However, if free spaces are simply provided in front of and after a data block that has been relocated to the SAS disk 112, the utilization efficiency of the SAS disk 112 degrades. Thus, the management unit 213 may make a prediction as to whether a data block is to be relocated to a space in front of or after a relocated data block on the basis of the frequency of relocation, and if the possibility of such relocation is high, the management unit 213 may set the spaces in front of and after the relocated data block to be free spaces.

Hereinafter, the operation of the storage system 1 of the embodiment will be described with reference to FIGS. 5 to 9.

[2-1] Operation of Storage System

The operation of the storage system 1 will be described with reference to the flowchart (steps S1 to S9) illustrated in FIG. 5.

As described above, with the storage hierarchization control of the disk control unit 121, the frequency of access to each data block can be determined, but it is not possible to determine the access mode of each data block. Meanwhile, in the storage system 1 of the embodiment, the virtual driver 212 is established on the server 20, and the virtual driver 212 and the storage hierarchization control function of the disk control unit 121 are made to cooperate by the management unit 213, making it possible to determine the access mode of the each data block.

In the server 20, if the application 211 issues an R/W command to a target file and the virtual driver 212 receives the R/W command (YES route in step S1), the virtual driver 212 refers to the file access mode table 221 in the memory 22 through the management unit 213. The virtual driver 212 then determines whether or not the application name of the application 211 that has issued the R/W command this time and the file name of the target file to be accessed by the application 211 are registered in the file access mode table 221 (step S2).

If the application name and the file name are both registered (YES route in step S2), the storage system 1 skips the processes in steps S3 and S4 and proceeds to the process in step S5. Meanwhile, if at least one of the application name and the file name is not registered (NO route in step S2), the virtual driver 212 determines and obtains the application name of the application 211, the file name of the target file, and the access mode of the target file (step S3). The procedure for determining the access mode in step S3 will be described later with reference to FIG. 6.

The virtual driver 212 then provides the management unit 213 with the obtained application name, file name, and access mode (see arrow A1 in FIG. 3) and registers the application name, the file name, and the access mode into the file access mode table 221 through the management unit 213 (step S4; see arrow A4 in FIG. 3). In the case where the application name is registered but the file name is not registered in the file access mode table 221, the virtual driver 212 provides the management unit 213 with the file name and the access mode.

Thereafter, in step S5, the disk control unit 121 obtains the block information that includes the storage location (physical location) of the data block in the target file which the application 211 is accessing and the access information (access frequency) of that data block (step S5; see arrow A2 in FIG. 3).

The disk control unit 121 then provides the management unit 213 of the server 20 with the obtained block information and access information (see arrow A3 in FIG. 3) and registers the block information and the access information into the file access mode table 221 through the management unit 213 (step S6; see arrow A4 in FIG. 3). Here, as described above, the storage location and the access frequency, which have been provided by the disk control unit 121, are associated with the access mode information by the application name or the file name and registered. The file access mode table 221 stored in the memory 22 is updated as evaluation of the access frequency or the like is repeated, and the management unit 213 instructs the disk control unit 121 to relocate a data block in accordance with the updated file access mode table 221 as follows.

Specifically, the management unit 213 refers to the file access mode table 221 (see arrow A5 in FIG. 3) and determines which data block is to be relocated (step S7). Here, the management unit 213 determines a data block that is located in the SSD 111 and has a low frequency of access to be the data block to be relocated to the SAS disk 112. Meanwhile, the management unit 213 determines a data block that is located in the SAS disk 112 and has a high frequency of access to be the data block to be relocated to the SSD 111. In addition, the management unit 213 refers to the file access mode table 221 (see arrow A5 in FIG. 3) and determines the access mode (sequential access or random access) of the data block to be relocated.

In addition, the management unit 213 determines the content of relocation in the hierarchized disk 11 on the basis of the block information (storage location) of the data block to be relocated, which has been determined to be a block to be relocated on the basis of the frequency of access thereto, and the access mode, which has been determined by the management unit 213, of the data block to be relocated. In other words, the management unit 213 determines or grasps the storage location of the data block to be relocated by referring to the file access mode table 221. As a result of grasping the storage location, if the data block to be relocated to the SAS disk 112 is located on the SSD 111, the management unit 213 determines the content of relocation such that the target data block is relocated to the SAS disk 112. In addition, as a result of grasping the storage location, if the data block to be relocated to the SSD 111 is located on the SAS disk 112, the management unit 213 determines the content of relocation such that the target data block is relocated to the SSD 111. Meanwhile, as a result of grasping the storage location, if the data block to be relocated to the SSD 111 is already located on the SSD 111, the management unit 213 retains the current arrangement of the target data block. Similarly, as a result of grasping the storage location, if the data block to be relocated to the SAS disk 112 is already located on the SAS disk 112, the management unit 213 retains the current arrangement of the target data block.

The management unit 213 instructs the disk control unit 121 of the storage device 10 to relocate the data block in accordance with the content of relocation determined as described above (step S8; see arrow A6 in FIG. 3).

The disk control unit 121 of the storage device 10 then relocates the data block in the hierarchized disk 11 in accordance with the content of data block relocation instructed by the management unit 213 (step S9).

[2-2] Access Mode Determination Procedure

Figure 5:
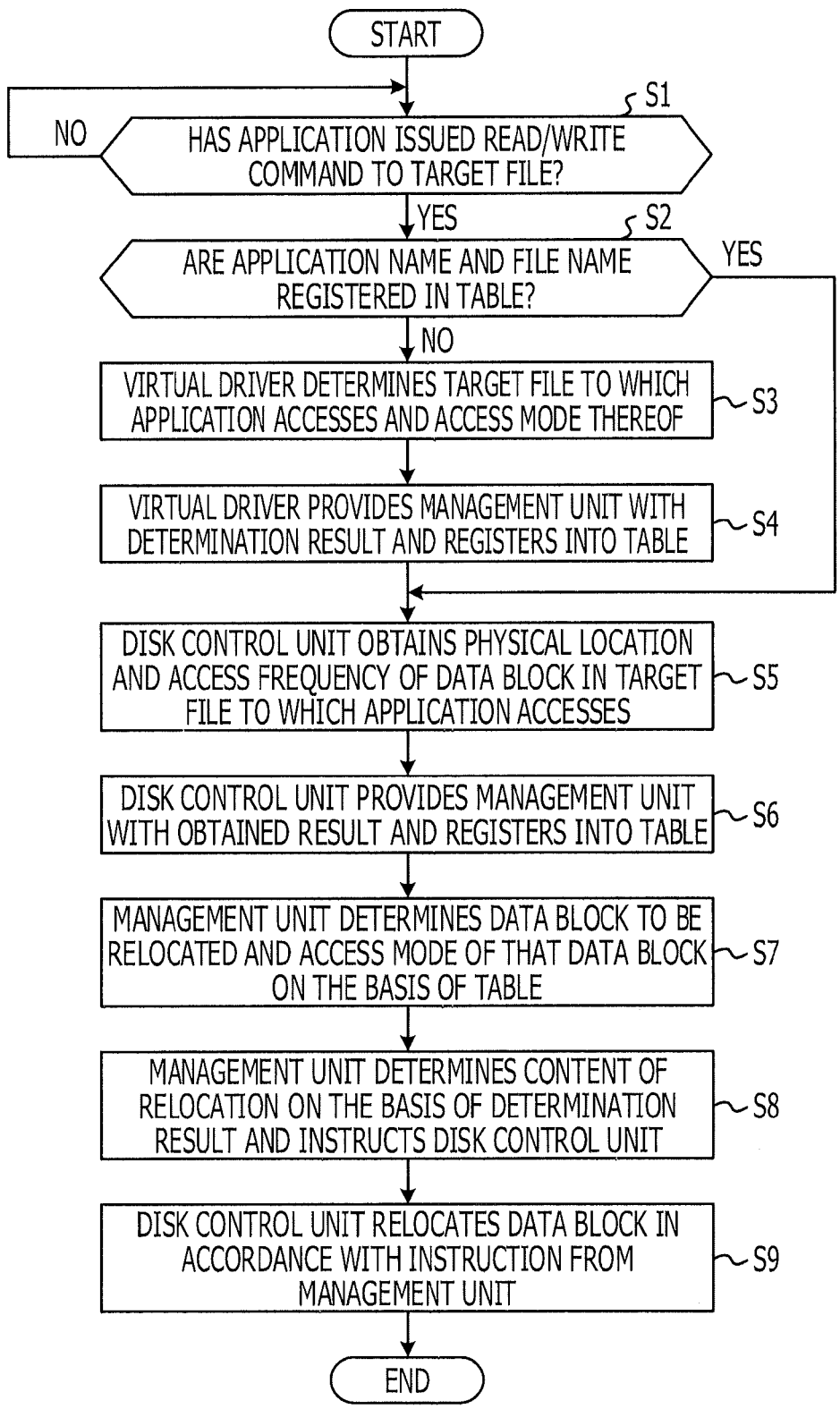
FIG. 5 is a flowchart for describing the operation of the storage system illustrated in FIG. 2.
Figure 6:
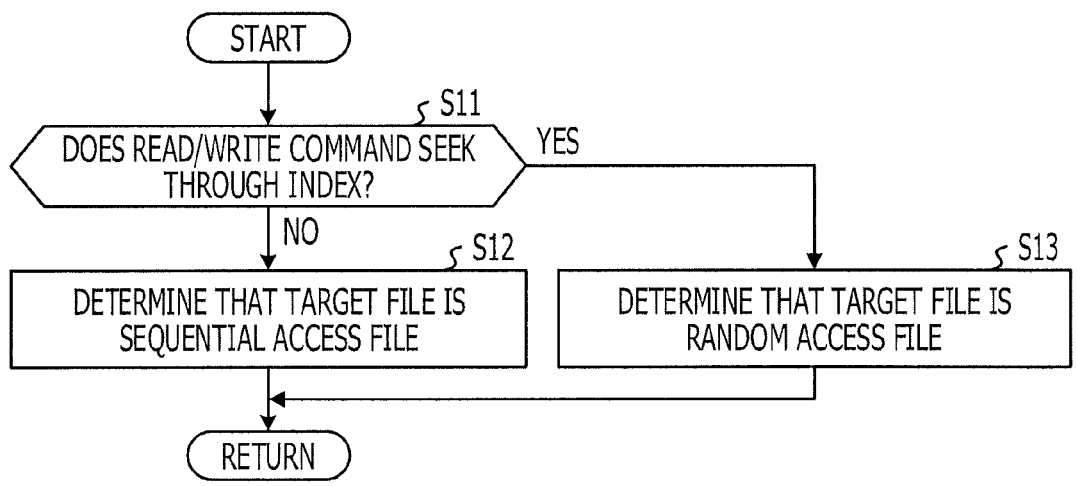
FIG. 6 is a flowchart for describing a procedure for determining an access mode of a target file in the embodiment.

In step S3 of FIG. 5, the virtual driver 212 determines the access mode of the target file through the procedure illustrated in FIG. 6. FIG. 6 is a flowchart (steps S11 to S13) for describing the procedure for determining the access mode (access characteristics) of the target file in the embodiment.

The virtual device 212 determines whether or not the R/W command seeks the R/W position in the target file through an index (step S11). If the R/W command does not seek the R/W position through an index, that is, when the R/W command reads the target file from the beginning thereof (NO route in step S11), the virtual device 212 determines that the target file is a sequential access file (step S12). Meanwhile, if the R/W command seeks the R/W position through an index (YES route in step S11), the virtual device 212 determines that the target file is a random access file (step S13).

[2-3] Relocation Procedure

Figure 7:
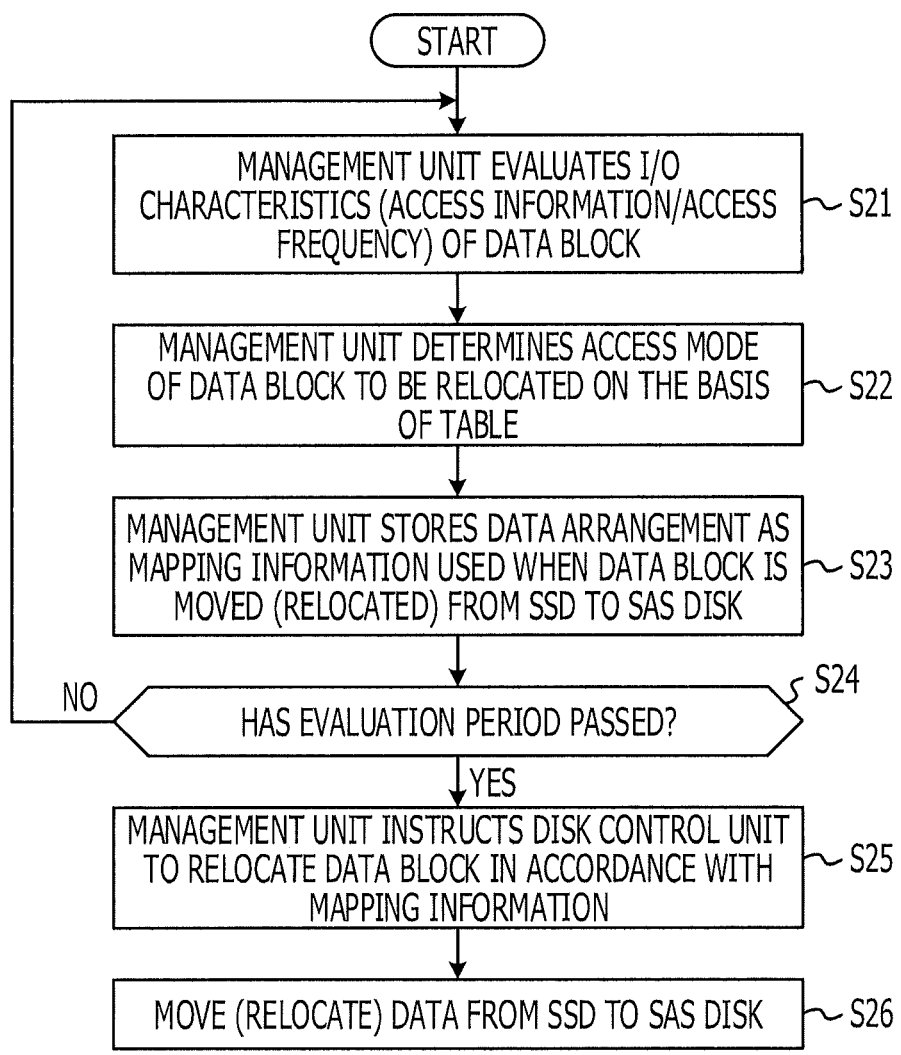
FIG. 7 is a flowchart for describing a procedure for relocating a data block from an SSD to an SAS disk in the embodiment.

Subsequently, with reference to the flowchart (steps S21 to S26) illustrated in FIG. 7, the procedure for relocating a data block from the SSD 111 to the SAS disk 112 (processes in steps S7 to S9 of FIG. 5) in the embodiment will be described in further detail.

First, the management unit 213 refers to the file access mode table 221 and evaluates I/O characteristics (access information/access frequency) of the data block in the target file accessed by the application 211 (step S21). Thus, the management unit 213 determines the data block that is located in the SSD 111 and has a low frequency of access to be the data block to be relocated to the SAS disk 112.

In addition, the management unit 213 refers to the file access mode table 221 and determines the access mode of the data block to be relocated, that is, whether the data block is a sequential access data block or a random access data block (step S22).

The management unit 213 then determines the content of relocation in the hierarchized disk 11 in a manner similar to that in step S8 of FIG. 5 on the basis of the information on the data block to be relocated (i.e., storage location of the data block) and the access mode of the data block. Then, the management unit 213 stores, in the memory 22, data arrangement as mapping information used when the data block to be relocated is moved (relocated) from the SSD 111 to the SAS disk 112 in accordance with the determined content of relocation (step S23).

Thereafter, the management unit 213 determines whether or not a specific evaluation period has passed (step S24), and if the evaluation period has not passed (NO route in step S24), the management unit 213 repeats the processes in steps S21 to S24 described above. At that time, the management unit 213 refers to the file access mode table 221 updated through the processes in steps S1 to S4 of FIG. 5.

Meanwhile, if the evaluation period has passed (YES route in step S24), the management unit 213 instructs the disk control unit 121 to relocate the data block in accordance with the mapping information stored in the memory 22 (step S25). The disk control unit 121 then moves (relocates) the data block to be relocated from the SSD 111 to the SAS disk 112 in accordance with the content of relocation instructed by the management unit 213 (step S26).

Note that the management unit 213 determines a data block that is located in the SAS disk 112 and has a high frequency of access to be the data block to be relocated to the SSD 111. As described above, in the SSD 111, whether the data blocks contained in a sequential access file are located sequentially or fragmented and arranged randomly does not make a difference in terms of access performance. Thus, when a data block is relocated from the SAS disk 112 to the SSD 111, the management unit 213 instructs the disk control unit 121 to relocate the target data block to any given free space, in the. SSD 111 without determining the access mode of the target data block. The disk control unit 121 thus relocates the target data block on the SAS disk 112 to any given free space in the SSD 111 in accordance with such an instruction from the management unit 213.

[2-4] Method for Determining Data Block Relocation Content

The method for determining the content of relocation by the management unit 213 in step S8 of FIG. 5 or in step S23 of FIG. 7 will now be described. Here, in particular, the method for determining the content of relocation for relocating data blocks that have been determined to be sequential access data blocks while retaining the sequentiality thereof will be described. Note that a file for which the access mode indicates sequential access will be referred to as a sequential file, and a file for which the access mode indicates random access will be referred to as a random file, hereinafter.

First, the method for determining the content of relocation in the storage system 1 of the embodiment will be described in brief, hereinafter. When relocating data blocks included in a sequential file, the management unit 213 determines the content of relocation such that the data blocks are arranged sequentially on the basis of the information obtained by the virtual driver 212. However, if some of the data blocks included in the file are not moved and the entire file is not relocated sequentially, the management unit 213 provides free spaces in front of and after the data blocks that have been relocated sequentially. Thus, when data blocks are to be relocated thereafter, the management unit 213 can locate the data blocks sequentially using the free spaces. Meanwhile, when data blocks included in a random file are to be relocated, the management unit 213 determines the content of relocation so as to relocate the data blocks in the random file to areas excluding the area for the data blocks in the sequential file and the free spaces. In addition, the management unit 213 may release the free spaces that have been provided in front of and after the partial data blocks when relocating the sequential file in the following cases. Specifically, the management unit 213 reevaluates the frequency of access through the storage hierarchization control function of the disk control unit 121 when relocating a random file. If the evaluation result remains the same, the management unit 213 determines that a data block in a sequential file is not to be relocated to the free space and releases the free space to allow a data block in a random file to be relocated thereto. Note that, as described above, if spaces in front of and after the relocated data block are simply set to be free spaces, the utilization efficiency of the disk degrades. Therefore, the management unit 213 may make a prediction as to whether a data block is to be relocated to a space in front of or after a relocated data block on the basis of the frequency of relocation, and if the possibility of such relocation is high, the management unit 213 may provide free spaces in front of and after the relocated data block.

In the storage system 1 of the embodiment, when a data block is relocated from the SSD 111 to the SAS disk 112, the management unit 213 determines the content of relocation, and the disk control unit 121 relocates the target data block, in a manner indicated by the following items (A1) to (A4).

(A1) Case where the access mode of the data block to be relocated indicates sequential access and a plurality of sequential data blocks are present on the SAS disk 112 to which the data block is to be relocated. The management unit 213 determines the content of relocation such that the plurality of sequential data blocks are sequentially relocated to the SAS disk 112 and instructs the disk control unit 121 accordingly. Thus, the disk control unit 121 sequentially relocates the plurality of sequential data blocks to the SAS disk 112 in the hierarchized disk 11 of the storage device 10.

(A2) Case where the access mode of the data block to be relocated indicates sequential access and another data block to be located in front of or after that data block is not present on the SAS disk 112 to which the data block is to be relocated. The management unit 213 determines the content of relocation such that a free space for the other data block is to be provided in front of or after the data block relocated to the SAS disk 112 and instructs the disk control unit 121 accordingly. Thus, the disk control unit 121 provides the free space for the other data block in front of or after the data block relocated to the SAS disk 112 in the hierarchized disk 11 of the storage device 10.

(A3) Case where the other data block is not relocated to the free space even after a specific period of time elapses or relocation processing of a data block is carried out a specific number of times after the free space is provided.

The management unit 213 determines the content of relocation such that the free space is released and a data block other than the other data block is relocated to the free space and instructs the disk control unit 121 accordingly. Thus, the disk control unit 121 relocates a data block other than the other data block to the free space.

(A4) Case where the access mode of the data block to be relocated indicates random access. The management unit 213 determines the content of relocation such that the data block is relocated in accordance with the arrangement of data blocks for which the access mode indicates sequential access and instructs the disk control unit 121 accordingly. Thus, the disk control unit 121, taking the area for the sequential access data blocks and the free space into consideration, relocates the random access data block to an area excluding the area for the sequential access data blocks and the free space.

Figure 8:
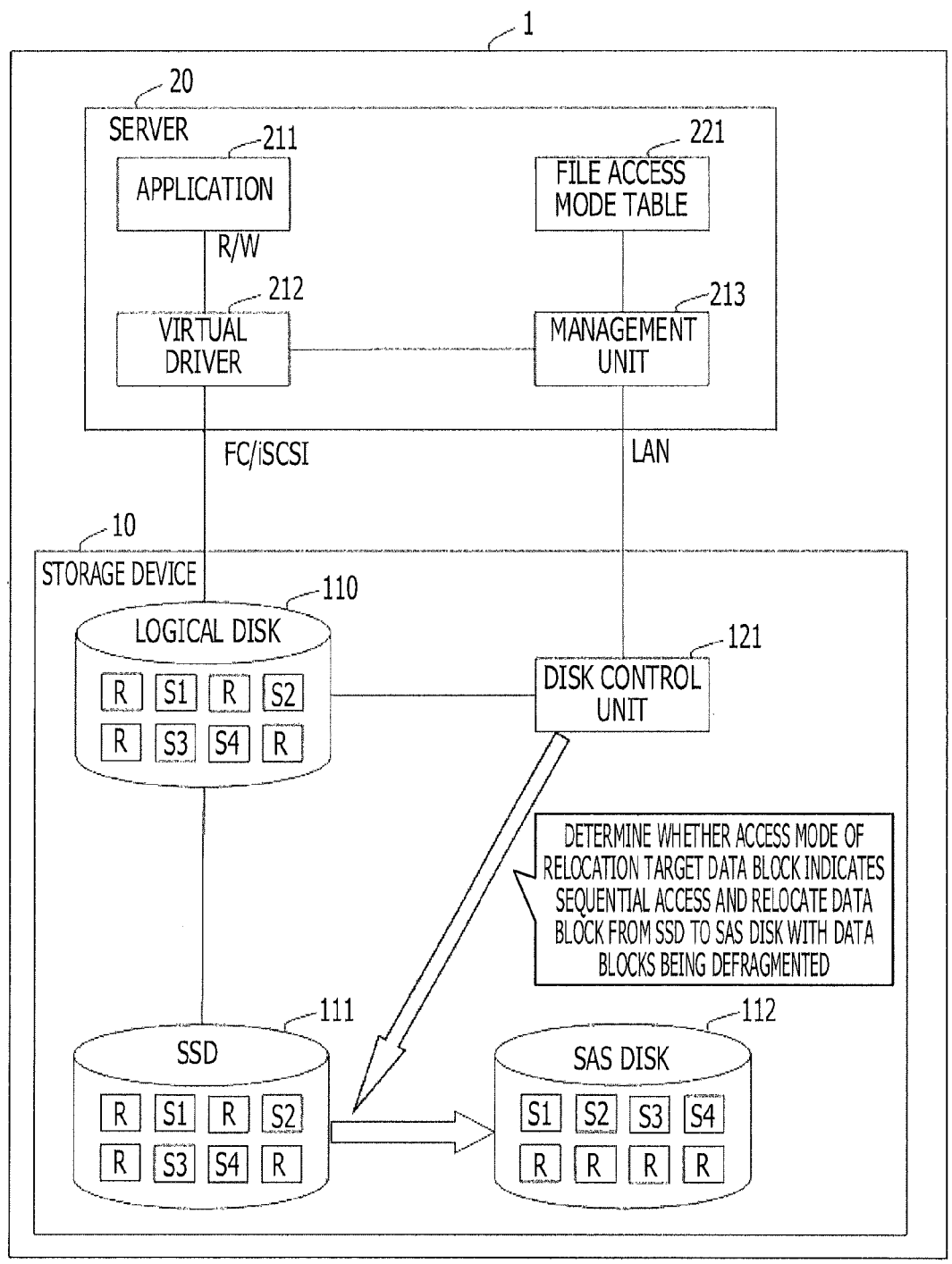
FIG. 8 illustrates a specific example on relocation of data blocks in the storage system illustrated in FIG. 2.
Figure 9:
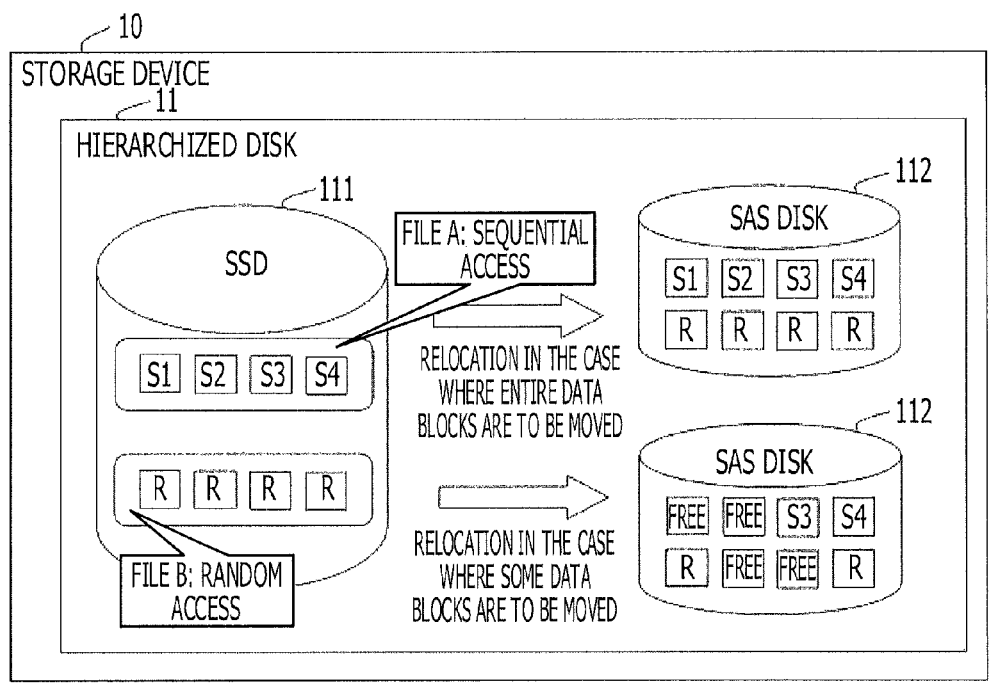
FIG. 9 illustrates a specific example on relocation of data blocks in the storage system illustrated in FIG. 2.

A specific example of relocation by the disk control unit 121 will now be described with reference to FIGS. 8 and 9. FIGS. 8 and 9 illustrate a specific example of relocating data blocks in the storage system 1. In FIGS. 8 and 9, four blocks S1 to S4 indicate sequential data blocks included in a sequential file A, and the four data blocks S1 to S4, which are to be arranged sequentially in this order, form the single sequential file A. A block labeled "free" indicates a free space that has a capacity of a single data block.

FIG. 8 illustrates a case where the four data blocks S1 to S4 included in the sequential file A located on the SSD 111 and four data blocks R included in a random file B located on the SSD 111 are to be relocated in the SAS disk 112. In such a case, the management unit 213 determines the access mode of each data block, that is, whether each data block is a sequential access data block or a random access data block, and then defragmentation relocation of the data blocks from the SSD 111 to the SAS disk 112 is carried out. Specifically, the four data blocks S1 to S4 included in the sequential file A are relocated so as to be arranged sequentially in the SAS disk 112. The four data blocks R included in the random file B are each relocated to a given free space aside from the areas where the data blocks S1 to S4 are located in the SAS disk 112.

In the case of the upper SAS disk 112 illustrated in FIG. 9, as in the example illustrated in FIG. 8, the entire data blocks included in the sequential file A and the random file B on the SSD 111 are to be moved (relocated) and are relocated to the SAS disk 112. In this case, relocation is carried out in a manner similar to that described with reference to FIG. 8.

In the case of the lower SAS disk 112 illustrated in FIG. 9, some of the data blocks included in the sequential file A and the random file B on the SSD 111 are to be moved (relocated) and are relocated to the SAS disk 112. In this case, the two data blocks S3 and S4 included in the sequential file A and the two data blocks R included in the random file B are to be moved (relocated) and are relocated to the SAS disk 112. In this case as well, the management unit 213 determines the access mode of each data block, that is, whether each data block is a sequential access data block or a random access data block, and then defragmentation relocation of the data blocks from the SSD 111 to the SAS disk 112 is carried out. Specifically, the two data blocks S3 and S4 included in the sequential file A are relocated so as to be arranged sequentially in the SAS disk 112. In addition, since there is a possibility that the sequential data blocks S1 and S2 are relocated in front of the data blocks S3 and S4 through later relocation processing, free spaces for two data blocks are provided. The two data blocks R included in the random file B are each relocated to a given free space excluding the area where the data blocks S3 and S4 are located and the free spaces for the two data blocks provided in front of the data blocks S3 and S4 in the SAS disk 112.

[3] According to the Storage System 1 of the Embodiment, the Following Effects Can be Obtained.

Associating the block information obtained by the disk control unit 121 with the access mode information obtained by the virtual driver 212 on the server 20 makes it possible to determine the access mode of the data blocks included in each file. Thus, the data blocks can be relocated on the basis of the result of determining the access mode of the data blocks, and thus degradation in performance of sequentially accessing data moved from the SSD 111 to the SAS disk 112 can be suppressed. In addition, data fragmentation caused by relocating the data blocks in the hierarchized disk 11 can be suppressed, making it possible to suppress a negative influence caused by fragmentation or the like.

Furthermore, the access mode of each target file used by the application 211 is determined by the virtual driver 212. Thus, the access mode of each file can be reliably determined as to whether the file is a sequential access file or a random access file at a section close to an operating system (OS). However, using the virtual driver 212 simply for determining the access mode may cause the access speed to be reduced. Thus, the virtual driver 212 continues with the determination of the access mode only for a specific period of time after the application 211 starts accessing the storage device 10 and stops the determination of the access mode after the specific period of time elapses. Accordingly, reduction in the access speed can be suppressed.

In addition, the virtual driver 212 collects access mode information only of the files that are not registered in the file access mode table 221. Thus, the block arrangement in the hierarchized disk 11 can be optimized without increasing a load on the disk access.

If the data blocks included in a sequential file are distributed between the SSD 111 and the SAS disk 112, providing free spaces in front of and after such data blocks makes it possible to relocate data blocks sequentially with ease.

Here, the management unit 213 makes a prediction as to whether a data block is to be relocated in front of or after a relocated data block on the basis of the frequency of relocation, and if the possibility of such relocation is high, the management unit 213 sets free spaces in front of and after the relocated data block. Thus, free spaces can be set in front of and after the data block relocated to the SAS disk 112 without reducing utilization efficiency of the SAS disk 112.

If another sequential data block is not relocated to the free space even after a specific period passes or relocation processing of data blocks is carried out a specific number of times after the free spaces are provided in front of and after the relocated data block, the management unit 213 releases the free spaces. Thus, the management unit 213 can relocate data blocks to the free spaces, and the area on the SAS disk 112 can be used effectively.

[4] Other

In the embodiment the single server 20 is provided for the single storage device 10. Alternatively, the storage system 1 may be configured such that multiple servers access the storage device 10. In such a case, at least one of the servers may be configured to function as the server 20 described above, and various pieces of information obtained by the server 20 may be shared among the multiple servers. Thus, an effect similar to that of the embodiment described above can be obtained in each of the servers by the use of the single server 20.

All or part of the functions of the disk control unit 121, the virtual driver 212, and the management unit 213 described above can be realized by a computer (including a CPU, an information processing device, and various terminals) that functions as a copy processing unit 24 executing a specific program (storage control program).

In addition, the application program may be provided in the form of a program recorded on a computer readable recording medium such as a flexible disk, a CD (CD-ROM, CD-R, CD-RW, etc.), a DVD (DVD-ROM, DVD-RAM, DVD-R, DVD-RW, DVD+R, DVD+RW, etc.) and a Blu-ray Disc. In such a case, the computer reads the program from the recording medium, transfers the program to an internal storage device or an external storage device, and stores the program therein for use.

Here, the computer conceptually includes hardware and an OS and refers to hardware that operates under the control of the OS. In addition, in a case in which the OS is unnecessary and the hardware is operated solely through a program, the hardware itself corresponds to the computer. The hardware includes at least a microprocessor such as a CPU and a unit configured to read a computer program recorded in the recording medium. The stated program includes program codes that cause the computer as described above to realize the functions of the disk control unit 121, the virtual driver 212, and the management unit 213. In addition, part of these functions may be realized not through the program but through the OS.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A non-transitory computer-readable recording medium having stored therein a program for causing a computer to execute a process, the process comprising:
    executing a first measuring of an access frequency of a first data block and a second data block included in a first file stored in a first storage;
    determining, based on the first measuring, to relocate the first data block to a second storage, while the second data block remains in the first storage;
    determining an access mode of the first file, the access mode including a sequential access mode or a random access mode;
    relocating the first data block to a first storing portion in the second storage;
    when the access mode of the first file is the sequential access mode, reserving a second storing portion next to the first storing portion as an empty region for the second data block;
    after reserving the second storing portion as the empty region for the second data block, executing a second measuring of the access frequency of the second data block stored in the first storage;
    determining, based on the second measuring, whether the second data block is to be relocated to the second storage;
    when it is determined, based on the second measuring, that the second data block is to be relocated to the second storage, storing the second data block in the second storing portion; and
    when it is determined, based on the second measuring, that the second data block is not to be relocated to the second storage, controlling the reserved empty region so that the second storing portion is not reserved for the second data block and so that the second storing portion is available for another data block.

2. The non-transitory computer-readable recording medium according to claim 1,
    wherein data of the first data block are sequentially relocated in the second storage when the determined access mode is the sequential access mode.

3. The non-transitory computer-readable recording medium according to claim 1,
    wherein the first data block relocated in the second storage is accessed using a seeking motion for a disk.

4. The non-transitory computer-readable recording medium according to claim 3,
    wherein a plurality of data blocks in the first storage is accessed without the seeking motion for the disk.

5. The non-transitory computer-readable recording medium according to claim 1,
    wherein the access mode is determined based on an access mode by an application accessing the first file.

6. The non-transitory computer-readable recording medium according to claim 5,
    wherein the access mode is determined based on whether an access position in the first file is sought.

7. The non-transitory computer-readable recording medium according to claim 6,
    wherein the determined access mode is the sequential access mode when the access position in the first file is not sought.

8. The non-transitory computer-readable recording medium according to claim 7,
    wherein data of the first data block are sequentially arranged in the second storage.

9. The non-transitory computer-readable recording medium according to claim 1,
    wherein the process further comprises:
        releasing the second storing portion for other data blocks when the second data block is not relocated to the second storage within a first period.

10. The non-transitory computer-readable recording medium according claim 5,
    wherein the access mode is determined during a second period after the application starts to access to the first file.

11. The non-transitory computer-readable recording medium according to claim 1, wherein the process further comprises:
    relocating a third data block included in a second file for which the determined access mode indicates the random access mode to a third storing portion in the second storage other than the second storing portion reserved for the second data block.

12. The non-transitory computer-readable recording medium according to claim 1,
    wherein the first storage and the second storage are hierarchically managed.

13. The non-transitory computer-readable recording medium according to claim 1,
    wherein a combination of the first storage and the second storage is managed as a virtual storage.

14. The non-transitory computer-readable recording medium according to claim 1,
    wherein an access speed of the first storage is faster than an access speed of the second storage.

15. The non-transitory computer-readable recording medium according to claim 1,
    wherein the identifying comprises identifying a plurality of data blocks for relocation, wherein the process further comprises sequentially relocating the plurality of identified data blocks to the second storage when the access mode is the sequential access mode.

16. A system comprising:
a memory; and
a processor coupled to the memory and configured to execute a process, the process including:
  executing a first measuring of an access frequency of a first data block and a second data block included in a first file stored in a first storage;
  determininq, based on the first measuring, to relocate the first data block to a second storage, while the second data block remains in the first storage;
  determining an access mode of the first file, the access mode including a sequential mode access or a random access mode; and
  relocating the first data block to a first storing portion in the second storage;
  when the access mode of the first file is the sequential access mode reserving a second storing portion next to the first storing portion as an empty region for the second data block;
  after reserving the second storing portion as the empty region for the second data block, executing a second measuring of the access frequency of the second data block stored in the first storage;
  determining, based on the second measuring, whether the second data block is to be relocated to the second storage;
  when it is determined, based on the second measuring, that the second data block is to be relocated to the second storage, storing the second data block in the second storing portion; and
  when it is determined, based on the second measuring, that the second data block is not to be relocated to the second storage, controlling the reserved empty region so that the second storing portion is not reserved for the second data block and so that the second storing portion is available for another data block.

17. A method comprising:
executing a first measuring of an access frequency of a first data block and a second data block included in a first file stored in a first storage;
determining, based on the first measuring, to relocate the first data block to a second storage, while the second data block remains in the first storage;
determining an access mode of the first file, the access mode including a sequential access mode or a random access mode; and
relocating the first data block to a first storing portion in the second storage,
when the access mode of the first file is the sequential access mode, reserving a second storing portion next to the first storing portion as an empty region for the second data block;
after reserving the second storing portion as the empty region for the second data block, executing a second measuring of the access frequency of the second data block stored in the first storage;
determining, based on the second measuring, whether the second data block is to be relocated to the second storage;
when it is determined, based on the second measuring, that the second data block is to be relocated to the second storage, storing the second data block in the second storing portion; and
when it is determined, based on the second measuring, that the second data block is not to be relocated to the second storage, controlling the reserved empty region so that the second storing portion is not reserved for the second data block and so that the second storing portion is available for another data block.

\* \* \* \* \*